(12) United States Patent
Das et al.

(10) Patent No.: US 10,681,418 B2
(45) Date of Patent: *Jun. 9, 2020

(54) TELEVISION ADVERTISEMENT TRACKING

(71) Applicant: PayPal Inc., San Jose, CA (US)

(72) Inventors: Ananya Das, Austin, TX (US); Bryant Genepang Luk, Round Rock, TX (US); Christopher Diebold O'Toole, Cedar Park, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,371

(22) Filed: Jan. 9, 2018

(65) Prior Publication Data

US 2018/0234731 A1 Aug. 16, 2018

Related U.S. Application Data

(63) Continuation of application No. 14/985,065, filed on Dec. 30, 2015, now Pat. No. 9,866,907.

(51) Int. Cl.
| | |
|---|---|
| *H04N 21/466* | (2011.01) |
| *H04N 21/81* | (2011.01) |
| *H04N 21/442* | (2011.01) |
| *H04N 21/44* | (2011.01) |
| *H04N 21/254* | (2011.01) |
| *H04N 21/2668* | (2011.01) |
| *H04N 21/45* | (2011.01) |
| *H04N 21/433* | (2011.01) |
| *H04N 21/6543* | (2011.01) |
| *H04N 21/431* | (2011.01) |

(Continued)

(52) U.S. Cl.
CPC ....... *H04N 21/4667* (2013.01); *H04N 21/254* (2013.01); *H04N 21/25866* (2013.01); *H04N 21/2668* (2013.01); *H04N 21/431* (2013.01); *H04N 21/433* (2013.01); *H04N 21/44008* (2013.01); *H04N 21/44218* (2013.01); *H04N 21/44222* (2013.01); *H04N 21/4532* (2013.01); *H04N 21/6543* (2013.01); *H04N 21/6582* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 2012/0253920 | A1* | 10/2012 | Yarvis | G06Q 30/0241 705/14.41 |
| 2014/0317646 | A1* | 10/2014 | Garza | H04N 21/44218 725/12 |

(Continued)

*Primary Examiner* — Omar S Parra
(74) *Attorney, Agent, or Firm* — Maschoff Brennan

(57) ABSTRACT

A method of television advertisement tracking is described. The method may include identifying an electronic advertisement that is playing on a television. The method may also include storing an identifier of the advertisement in an electronic data storage. The method may include identifying, by the processing device, an activity of a user on a client device. The method may also include determining, by the processing device, an effectiveness score of the advertisement with respect to the user based on the activity of the user on the client device. The method may include storing the effectiveness score of the advertisement in association with the identifier of the advertisement.

18 Claims, 4 Drawing Sheets

(51) Int. Cl.
*H04N 21/258* (2011.01)
*H04N 21/658* (2011.01)

(56) References Cited

U.S. PATENT DOCUMENTS

2015/0026708 A1* 1/2015 Ahmed ............. H04N 5/23206
    725/12
2015/0237412 A1* 8/2015 Shimy ................. H04N 21/812
    725/12

* cited by examiner

TELEVISION ADVERTISEMENT TRACKING

CROSS-REFERENCE TO RELATED APPLICATIONS

This application is a continuation of U.S. patent application Ser. No. 14/985,065, filed on Dec. 30, 2015, now U.S. Pat. No. 9,866,907, issued on Jan. 9, 2018; the disclosure of this patent is incorporated by reference herein.

FIELD

The embodiments discussed herein are related to television advertisement tracking.

BACKGROUND

To help sell their goods and/or services, merchants often use television advertisements. The merchants either create the advertisements or they may hire a third party to create the advertisements. The merchants may provide the advertisements to a television broadcaster for display on a consumer's television.

The subject matter claimed herein is not limited to embodiments that solve any disadvantages or that operate only in environments such as those described above. Rather, this background is only provided to illustrate one example technology area where some embodiments described herein may be practiced. Further, unless otherwise indicated, the materials described in the background section are not prior art to the claims in the present application and are not admitted to be prior art by inclusion in this section.

SUMMARY

According to an aspect of an embodiment, a method of television advertisement tracking may include identifying an electronic advertisement that is playing on a television. The method may also include storing an identifier of the advertisement in an electronic data storage. The method may include identifying, by the processing device, an activity of a user on a client device. The method may also include determining, by the processing device, an effectiveness score of the advertisement with respect to the user based on the activity of the user on the client device. The method may include storing the effectiveness score of the advertisement in association with the identifier of the advertisement.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Merchants may advertise to consumers through television advertisements. These merchants, however, may not be able to track how well the advertisements are received by consumers or how effective the advertisements may be to certain consumer demographics. Thus, there may be a disconnect between advertisements being displayed on television and an understanding of how those advertisements may influence further action related to a subject of the advertisement. Because of this disconnect, and for other reasons, merchants and advertisers may not know how effective their advertisements are to various users and demographics.

Aspects of the disclosure address these and other shortcomings of conventional television advertising by providing systems and methods for tracking television advertisement efficacy. Techniques described herein may help merchants and advertisers better understand and track efficaciousness of various advertisements broadcast on televisions. This new understanding made possible by the techniques described herein may provide improved advertisement targeting for various users and demographics. For example, a user may view a car commercial on a television. The systems and methods described herein may identify activities of that user, such as whether that user browses the Internet for the car depicted in the commercial, or whether that user visits a car dealership that sells the car model depicted in the commercial. The systems and methods may use the user activities to determine which advertisement may be more likely to cause the user to make a purchase.

Figure 1:
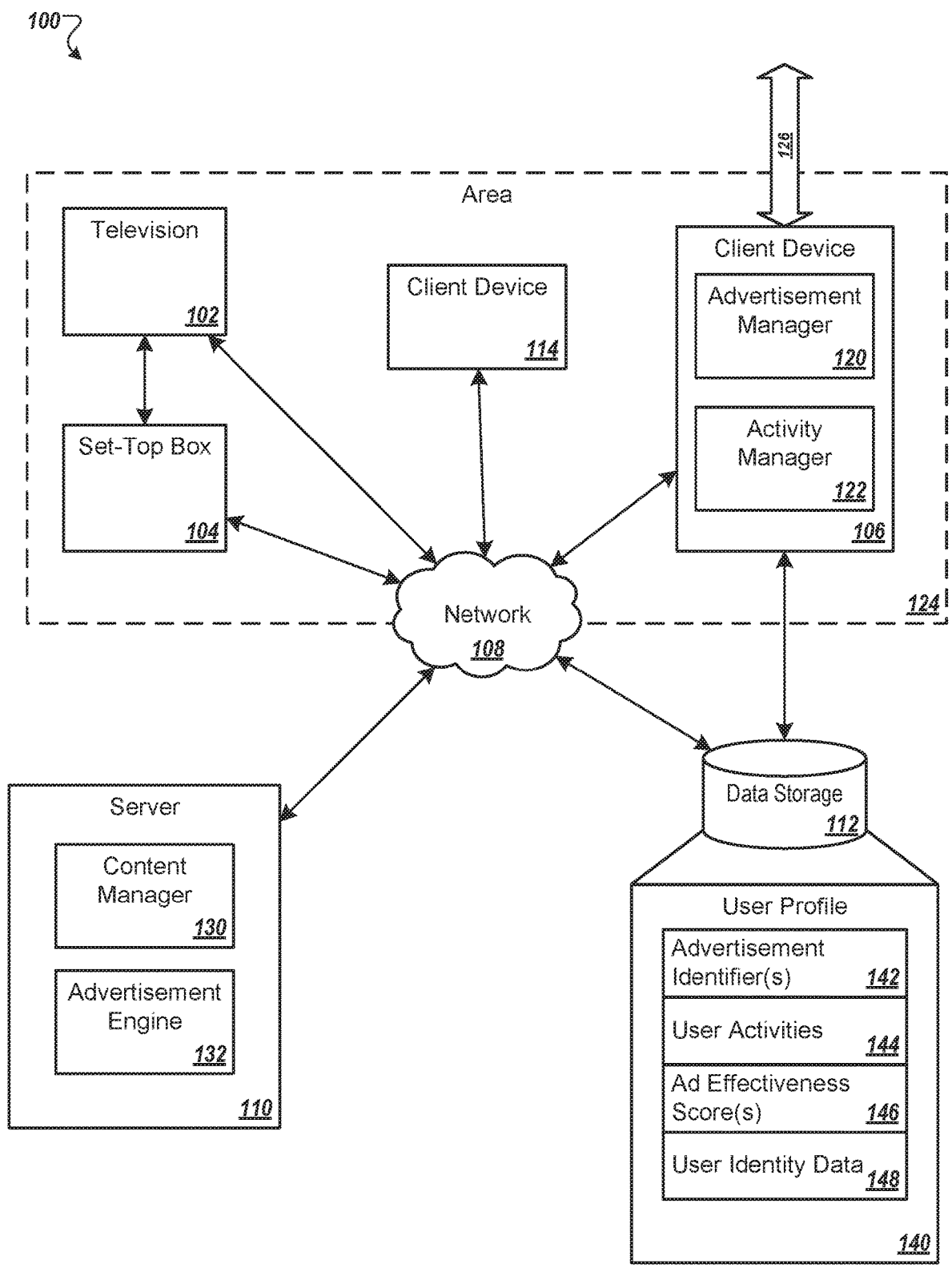
FIG. 1 is a block diagram of an example operating environment in which some embodiments may be implemented.

FIG. 1 illustrates a block diagram of an example operating environment 100 in which some embodiments may be implemented, arranged in accordance with at least one embodiment described herein. The example operating environment 100 may include a television 102, a set-top box 104, a client device 106, a network 108, a server 110 and a data storage 112.

The television 102 may include a device that is configured to present video content via a display device. The video content may include an audio component that plays simultaneously with the video content. For ease in explanation, "video content" may refer to a combination of video and audio content. The video content may include an electronic file that may be executed or loaded using software, firmware or hardware configured to present the content to a user via the television 102. Video content may also include live-streamed content and media items available on-demand. The television 102 may receive the video content from any source, such as from an over-the-air broadcaster, satellite, cable, a streaming device (e.g., from the client device 106), or from any other source capable of sending video content to the television 102. The video content may include (or be supplemented with) one or more electronic advertisements. The electronic advertisements may advertise any product or service and may be received from any source. In at least one embodiment, to play an advertisement, the television 102 may stop playback of video content and play the advertisement. Once presentation of the advertisement is complete, the television 102 may resume playback of the video content.

In at least one embodiment, the example operating environment 100 may include a set-top box (STB) 104. The STB 104 may include a device that is configured to convert video content to analog or digital TV signals. In at least one embodiment, the STB 104 includes a satellite TV receiver or an over-the-air digital-to-analog converter. In at least one other embodiment, the STB 104 may include a media hub that connects to a local network for Internet access and may convert video from online media providers (e.g., Netflix, Hulu) into TV signals. The STB 104 may also connect to and receive content from the client device 106. The STB 104 may send analog or digital TV signals to the television 102 for playback. In at least one embodiment the STB 104 is integrated with the television 102.

The client device 106 may include a computing device which may include, but is not limited to, a desktop computer, a laptop computer, a tablet computer, a mobile phone, a smartphone, a personal digital assistant (PDA), or other suitable computing device. The client device 106 may include any number of applications that may enable a user to perform various tasks. The applications may also include various advertisement and activity tracking components. In at least one embodiment, the client device 106 may include one or more sensors, receivers and/or transceivers (not illustrated) that may be configured to detect activities. The sensors, receivers and/or transceivers may include an audio sensor (e.g., a microphone), a wireless digital signal transceiver (e.g., Wi-Fi, Bluetooth, ZigBee, Z-Wave), a motion sensor (e.g., gyroscope, accelerometer, GPS unit), and the like.

In general, the network 108 may include one or more wide area networks (WANs) and/or local area networks (LANs) that enable the television 102, set-top box 104, client device 106, server 110, and data storage 112 to communicate with each other. In some embodiments, the network 108 includes the Internet, including a global internetwork formed by logical and physical connections between multiple WANs and/or LANs. Alternately or additionally, the network 108 may include one or more cellular RF networks and/or one or more wired and/or wireless networks such as, but not limited to, 802.xx networks, Bluetooth access points, wireless access points, Long Term Evolution (LTE) or LTE-Advanced networks, IP-based networks, or the like. The network 108 may also include servers that enable one type of network to interface with another type of network.

The example operating environment 100 may include any number of servers 110. The server 110 may include one or more computing devices, (such as a rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components. The server 110 may provide digital content (e.g., digital video, streaming video, images, digital music, streaming music, social media information, etc.) to the television 102 and/or the STB 104. To provide digital content, for example, the server 110 determine whether a user is permitted to access content selected by the user (e.g., whether the user is a subscriber). The server 110 may also provide advertisements to the television 102 and/or the STB 104.

In at least one embodiment, the data storage 112 may include a memory (e.g., random access memory), a cache, a drive (e.g., a hard drive), a flash drive, a database system, or another type of component or device capable of storing data. The data storage 112 may also include multiple storage components (e.g., multiple drives or multiple databases) that may span multiple computing devices (e.g., multiple server computers). The data storage 112 may store one or more user profiles 140 that include advertisement information about a user. For example, the user profile 140 may include information about what advertisements a user may have been exposed to (stored as advertisement identifier(s) 142), what user activities the user may have been engaged in while being exposed to the advertisement (stored as user activities 144), an advertisement effectiveness score 146 and user identity data 148. Although each of the client device 106 and data storage 112 are depicted in FIG. 1 as single, disparate components, these components may be implemented together in a single device or networked in various combinations of multiple different devices that operate together.

The client device 106 may also include an advertisement manager 120 that, based at least in part on activities of the user and/or the client device, may determine effectiveness of an advertisement with respect to a user (or of a demographic that includes the user). The advertisement manager 120 may be configured to detect an advertisement that is currently playing on the television 102. In at least one embodiment, when playing an advertisement, the television 102 (or STB 104) may send a message (e.g., a digital communication) to the advertisement manager 120 that identifies the advertisement. The message may include an identifier of the advertisement (which the advertisement manager 120 may store as an advertisement identifier 142 in the data storage 112), one or more timestamps (e.g., start time of the advertisement, end time of the advertisement), a length of the advertisement, etc. In at least one embodiment, the message may include a sound that may be detected by a microphone of the client device 106. The sound may be associated with a particular advertisement. In at least one embodiment, the sound may be outside of a human auditory range. The advertisement manager 120 may receive a notification that the microphone has detected the sound and that the particular advertisement is playing on the television 102. The advertisement manager 120 may record an identifier 142 of the advertisement and a timestamp in the user activities 144 of data storage 112. In at least one other embodiment, the message may be a digitized message (e.g., binary code) that may be associated with a particular advertisement identifier in the database. The advertisement manager 120 may look up the digitized message in a database to identify the advertisement identifier.

In at least one embodiment, the television 102 or the STB 104 may send channel information and a location (e.g., a zip code) to the client device 106. The client device 106 may use the channel information and location to look up a TV listing that includes information and timestamps for advertisements that were played. In at least one embodiment, the television 102 or the STB 104 may receive metadata with the content such that the television 102 or the STB 104 are aware of what advertisements are to be played at what times. The television 102 or the STB 104 may send this information to the client device 106.

The client device 106 may include at least one application (not illustrated) that allows an end user to select and/or view content on the television 102 via the STB 104. For example, the application may be a web browser that may present a list of video content items to the end user. As a web browser, the application may also access, retrieve, present, and/or navigate content (e.g., web pages such as Hyper Text Markup Language (HTML) pages, digital media items, etc.) served by a web server. The application may render, display, and/or present the list content to the end user. The application may also provide an embedded media player (e.g., a Flash® player or an HTML5 player) that is embedded in a web page (e.g., a web page that may provide information about a product sold by an online merchant). In another example, the application may be a standalone application (e.g., a mobile application or mobile app) that allows users to consume digital media items (e.g., digital videos, digital images, electronic books, websites, etc.). The application may be provided to the client device 106 by the server 110 or via an application store.

The client device 106 may include an activity manager 122 to identify one or more activities of the user and/or the client device 106. Example activities may include being exposed to an advertisement (e.g., an advertisement detected by the advertisement manager, a movement (e.g., movement of a physical location or position), a consumer activity (e.g., browsing webpages, making a purchase), a disinterested activity (e.g., an activity that may indicate a low level of user interest in an advertisement), etc. The activity manager 122 may identify activities pertaining to a particular advertisement before, during and/or after the television 102 plays the advertisement. In at least one embodiment, the activity manager 122 may monitor other applications and activities of the user on the client device 106.

In an example pertaining to the activity manager 122 detecting a movement activity, the example operating environment 100 may include an area 124. The area 124 may be geographically defined, such as by a building, a room within the building, etc. In at least one embodiment, the area 124 may be defined by a video content-based characteristic, a characteristic of the television 102 and/or a sensor of the client device 106. For example, the area 124 may be defined by a current volume level of video content that is playing on the television 102, as detected by a microphone of the client device 106. The client device 106 may move in and out of the area 124 as illustrated by the arrow 126. The activity manager 122 may determine when the client device 106 moves in and out of the area 124. For example, when the client device 106 moves far enough away from the television 102 such that the microphone no longer detects sound from the television 102 (or the detected sound falls below a sound threshold), then the activity manager 122 may determine that the client device 106 may have moved outside of the area 124. In at least one embodiment, the activity manager 122 may use a detected volume level to determine a user distance from the television 102.

In another example, the client device 106 may connect to the television 102 and/or the STB 104 via a wireless link, such as Bluetooth. The wireless link may be disconnected when the client device 106 moves further than a threshold distance away from the television 102 and/or the STB 104. In at least one embodiment, a wireless radio may be configurable to cover a user-selected distance. The television 102 and/or the STB 104 may detect that the connection to the client device 106 has been lost in response to the connection being disconnected. Any of the activities may be stored as user activities 144 in the user profile 140 in the data storage 112. User activities 144 may be stored in association with a particular advertisement identifier 142 when the user activities 144. For example, activities that the user engages in while the advertisement is playing on the television 102 may be associated with each other.

In another example, the activity manager 122 may determine that the client device 106 was previously in or near a retail store based on a beacon device at the retail store. The activity manager 122 may later determine that the user is near the television 102. Based on beacon information, the advertisement manager 120 may select an advertisement to present via the television 102. The advertisement, for example, may relate to a product that is sold in the retail store. Similarly, the activity manager 122 may determine, such as by using beacon technology, whether the client device 106 travels near the retail store after the advertisement was presented via the television 102. The activity manager 122 may also detect whether a purchase occurs at the store. For example, the store may send information to the activity manager 122 indicative of the purchase. In another example, the user may authorize the activity manager 122 to receive information of the purchase, such as via an electronic receipt emailed to the user.

The advertisement manager 120 may use the advertisement identifier 142 and associated user activities 144 to determine an advertisement effectiveness score 146. The advertisement effectiveness score 146 may indicate an aggregate effectiveness of an advertisement with respect to the user. Effectiveness may relate to whether the user took further action related to the advertisement after seeing the advertisement. User activities that may indicate positive reception of the advertisement may increase the effectiveness score 146. Similarly, user activities that may indicate negative reception of the advertisement may decrease the effectiveness score 146. For example, during or after a movie-related advertisement is presented on the television 102, the activity manager 122 may detect that the user used the client device 106 to search for show times for the movie. Such an activity may increase the effectiveness score 146. In another example, the user changing the channel or leaving the area 124 while the advertisement is being presented on the television 102 may decrease the effectiveness score 146. The advertisement manager 120 may update an effectiveness score 146 based on additional activities of the user, such as the user being exposed to another identical or similar advertisement, the user making a purchase of a product or service that was featured in the original advertisement, etc.

The user profile 140 may also include user identity data 148. The user identity data 148 may include basic information about the user for purposes of advertisement tracking. For example, the user identity data 148 may include a device identifier (e.g., MAC address, UUID) to identify the user. In at least one embodiment, the user identity data 148 may include account information or a "logged-in" status for accounts associated with other applications and/or platforms. The activity manager 122 may report any of the information in the user profile 140 to the advertisement engine 132.

The advertisement engine 132 may use any of the information in the user profile 140 to for various marketing and advertising campaigns to the user, to a demographic that includes the user, etc. For example, if the user profile 140 includes information that after the user was exposed to an advertisement three times, the user was more likely to engage in an unrelated activity (e.g., walk away from the television, change the channel, browse the web for an unrelated feature, talk to others in the area 124), then the advertisement engine 132 may set a maximum number of times to send a future advertisement to the user.

In at least one embodiment, the example operating environment 100 may include multiple client devices, for example another client device 114. The television 102 and/or the STB 104 may detect client devices (e.g., client device 106 and client device 114) that may be in or near the area 124. The television 102 and/or the STB 104 may detect a first user profile associated with the client device 106 and a second user profile that is associated with the client device 114. For example, the television 102 and/or the STB 104 may detect a device identifier (e.g., MAC address, UUID) for each client device and then determine that a first UUID of the client device 106 is associated with the first user profile and a second UUID of the client device 114 is associated with the second user profile. The television 102 and/or the STB 104 may select advertisements to present based on the first user profile and the second user profile. For example, the first user profile and the second user profile may both indicate an interest in tennis and the first user profile may indicate a recent purchase of a new tennis racquet. The television 102 and/or the STB 104 may select an advertisement for the tennis racquet to present via the television 102.

In at least one embodiment, the advertisement manager 120 may identify the first and second user profiles. In at least one embodiment, the client device 114 may also include advertisement manager (not illustrated) that may communicate with advertisement manager 120 on the client device 106. For example, the advertisement manager pair may share user profiles and, based on the first and second user profiles, may request a particular advertisement from the advertisement engine 132.

In at least one embodiment, some of the example described may be performed by the advertisement engine 132. For example, the television 102 and/or the STB 104 may detect the first user profile and the second user profile and send them to the advertisement engine 132. The advertisement engine 132 may use the first user profile and the second user profile to determine the tennis racquet advertisement. The advertisement engine 132 may cause the tennis racquet advertisement to be presented on the television 102. In at least one embodiment, the tennis racquet advertisement may be presented via the television 102 during a next commercial break.

Modifications, additions, or omissions may be made to the example operating environment 100 without departing from the scope of the present disclosure. Specifically, embodiments of the example operating environment 100 are depicted in FIG. 1 as including one television 102, one set-top box 104, one network 108, one server 110 and one data storage 112. However, the present disclosure applies to an example operating environment 100 including one or more televisions 102, one or more set-top boxes 104, one or more networks 108, one or more servers 110 and one or more data storages 112, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

In situations in which the systems discussed here collect personal information about users, or may make use of personal information, the users may be provided with an opportunity to control whether the systems discussed collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the systems discussed.

Figure 2:
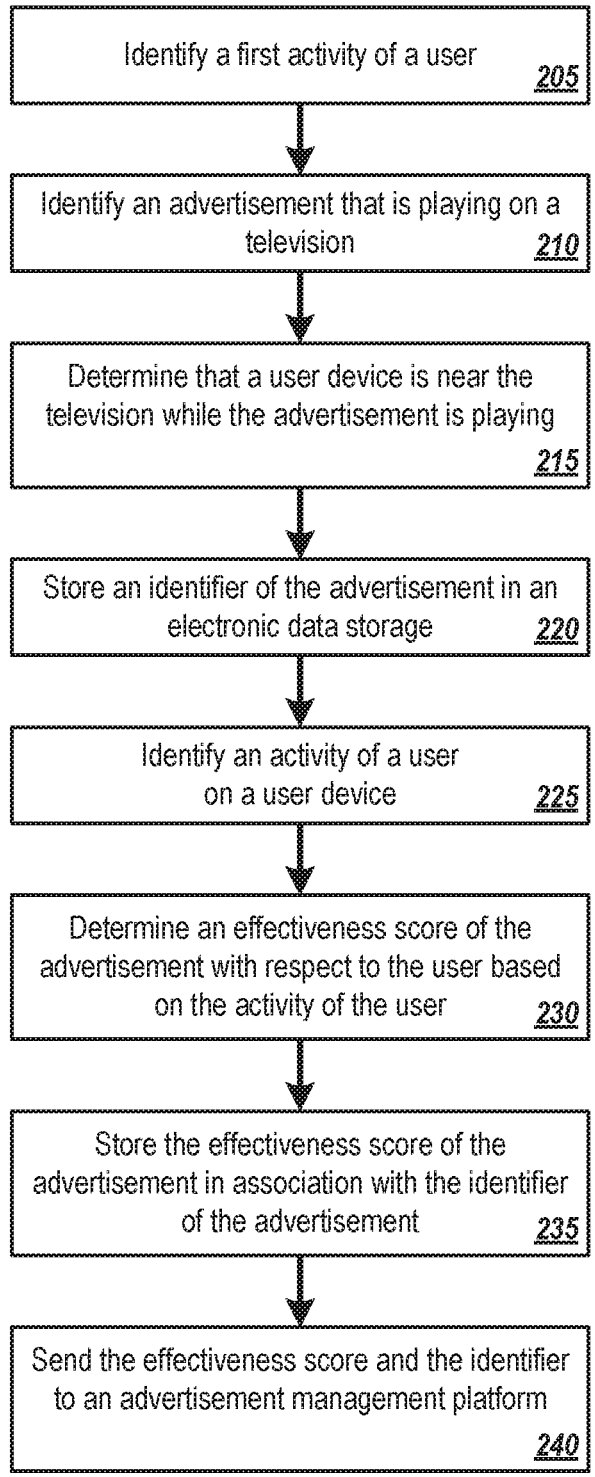
FIG. 2 illustrates an example flow diagram of a method of television advertisement tracking that may be implemented in the operating environment of FIG. 1.
Figure 3:
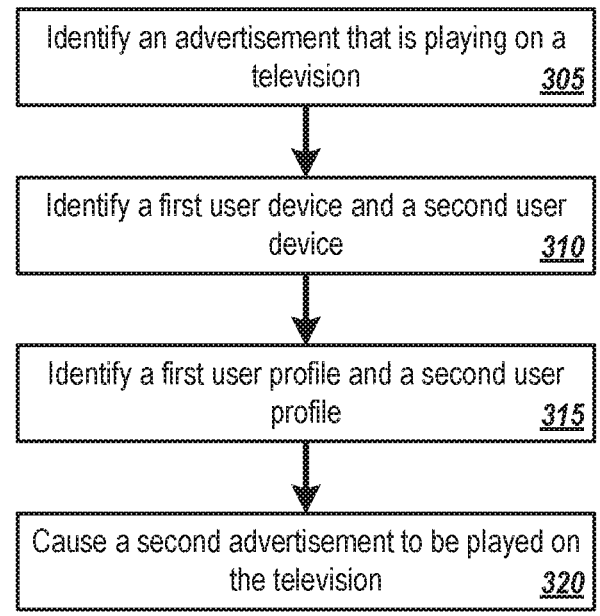
FIG. 3 illustrates an example flow diagram of another method of television advertisement tracking.

FIGS. 2-3 illustrate flow diagrams of various methods related to television advertisement tracking. The methods may be performed by processing logic that may include hardware (circuitry, dedicated logic, etc.), software (such as is run on a general purpose computer system or a dedicated machine), or a combination of both, which processing logic may be included in the television 102, the STB 104, the client device 106, the server 110, or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 2 illustrates an example flow diagram of a method 200 of television advertisement tracking that may be implemented in the operating environment of FIG. 1, arranged in accordance with at least one embodiment described in the present disclosure.

The method 200 may begin at block 205, where processing logic may identify a first activity of a user. Example activities may include being exposed to an advertisement (e.g., an advertisement detected by the advertisement manager, a movement (e.g., movement of a physical location or position), a consumer activity (e.g., browsing webpages, making a purchase), a disinterested activity (e.g., an activity that may indicate a low level of user interest in an advertisement), etc. The processing logic may identify activities pertaining to a particular advertisement before, during and/or after a television plays the advertisement. In at least one embodiment, the processing logic may monitor other applications and activities of the user on a client device.

At block 210, the processing logic may identify an advertisement that is playing on a television. The television or a STB connect to the television may send a message that indicates the advertisement is being played on the television, as further described above.

At block 215, the processing logic may determine that a client device is near the television while the advertisement is playing. The processing logic may detect a connection between a television and/or set-top box and the client device. The connection may be a wireless connection where the television and/or set-top box are paired with the client device. In at least one embodiment, the processing logic may periodically ping the client device and listen for a response. When the processing logic receives a response to a ping, the processing logic may determine that the client device is near the television. In at least one embodiment, the processing logic may send the ping in response to identifying the advertisement that is playing on the television at block 215. In at least one embodiment, the processing logic may listen for a hello message from the client device. Upon receiving the hello message, the processing logic may determine that the client device is near the television while the advertisement identified at block 215 is playing. At block 220, the processing logic may store an identifier of the advertisement in an electronic data storage. At block 225, the processing logic may identify an activity of a user on a client device, as further described in conjunction with FIG. 1.

At block 230, the processing logic may determine an effectiveness score of the advertisement with respect to the user based on the activity of the user on the client device. At block 235, the processing logic may store the effectiveness score of the advertisement in association with the identifier of the advertisement. The processing logic may store the identifier of the advertisement and the effectiveness score of the advertisement in a first user profile for the user. The advertisement effectiveness score may indicate an effectiveness of an advertisement with respect to the user. Effectiveness may relate to whether the user took further action related to the advertisement after seeing the advertisement. User activities that may indicate positive reception of the advertisement may increase the effectiveness score. Similarly, user activities that may indicate negative reception of the advertisement may decrease the effectiveness score.

At block 240, the processing logic may send the effectiveness score of the advertisement (i.e., the first advertisement) and the identifier of the first advertisement to an advertisement engine. The advertisement engine may be configured to cause a second electronic advertisement to be played on the television based on the effectiveness score of the first advertisement and the identifier of the first advertisement. For example, the advertisement engine may determine that the first advertisement is associated with a particular type or category of advertisements. Based on the effectiveness score of the first advertisement, that type or category of advertisements may not be as interesting to the user. The advertisement engine may select the second advertisement that may be more interesting to the user by selecting an advertisement from a particular type or category of advertisements, where one or more of the advertisements in that particular type or category may have a higher effectiveness score than the first advertisement.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

FIG. 3 illustrates an example flow diagram of another method 300 of television advertisement tracking. At block 305, the processing logic may identify an advertisement that is playing on a television, as further described above.

At block 310, the processing logic may identify a first client device and a second client device. The processing logic identify the first client device and the second client device by detecting a connection between a television and/or set-top box and the first client device and the second client device. The connection may be a wireless connection where the television and/or set-top box are paired with the first client device and the second client device. In at least one embodiment, the processing logic may periodically ping the first client device and the second client device and listen for a response. When the processing logic receives a response to a ping, the processing logic may determine that the first client device and/or the second client device are near the television. In at least one embodiment, the processing logic may send the ping in response to identifying an advertisement that is playing on the television. In at least one embodiment, the processing logic may listen for a hello message from the first client device and the second client device. Upon receiving the hello message, the processing logic may determine that the first client device and/or the second client device is near the television.

At block 315, the processing logic may identify a first user profile and a second user profile. The processing logic may identify the first user profile and the second user profile based on identifying the first client device and the second client device at block 310. For example, the processing logic may identify the first client device and the second client device, determine a device ID for each device and lookup the device IDs in a data storage. The device may be stored in the data storage in association with a corresponding user profile. The processing logic may identify the first user profile and the second user profile by looking up respective device IDs for the first client device and the second client device. In at least one embodiment, the processing logic may identify the first user profile and the second user profile without identifying the first client device and the second client device. For example, a user may log into an account on the television and/or the set-top box. The user may also log into the same account from their respective client device. The television and/or the set-top box and the client device may be connected to a same network. The processing logic may detect that the user is logged into account on the television and/or the set-top box and the client device and on the same network. The processing logic may identify the user profile based on this detection that the user is logged into account on the television and/or the set-top box and the client device and on the same network.

At block 320, the processing logic may cause a second advertisement to be played on the television. In at least one embodiment, the processing logic may cause an advertisement to be played on the television based on the identification of the first client device and the second client device at block 310. In at least one embodiment, the processing logic may cause an advertisement to be played on the television based on the identification of the first user profile and the second user profile at block 315. In at least one embodiment, the processing logic may determine that the second client device (or second user profile) has entered an area. Based on the second client device (or second user profile) entering the area, the processing logic may identify a second advertisement as being possibly more interesting to the first user and the second user.

Figure 4:
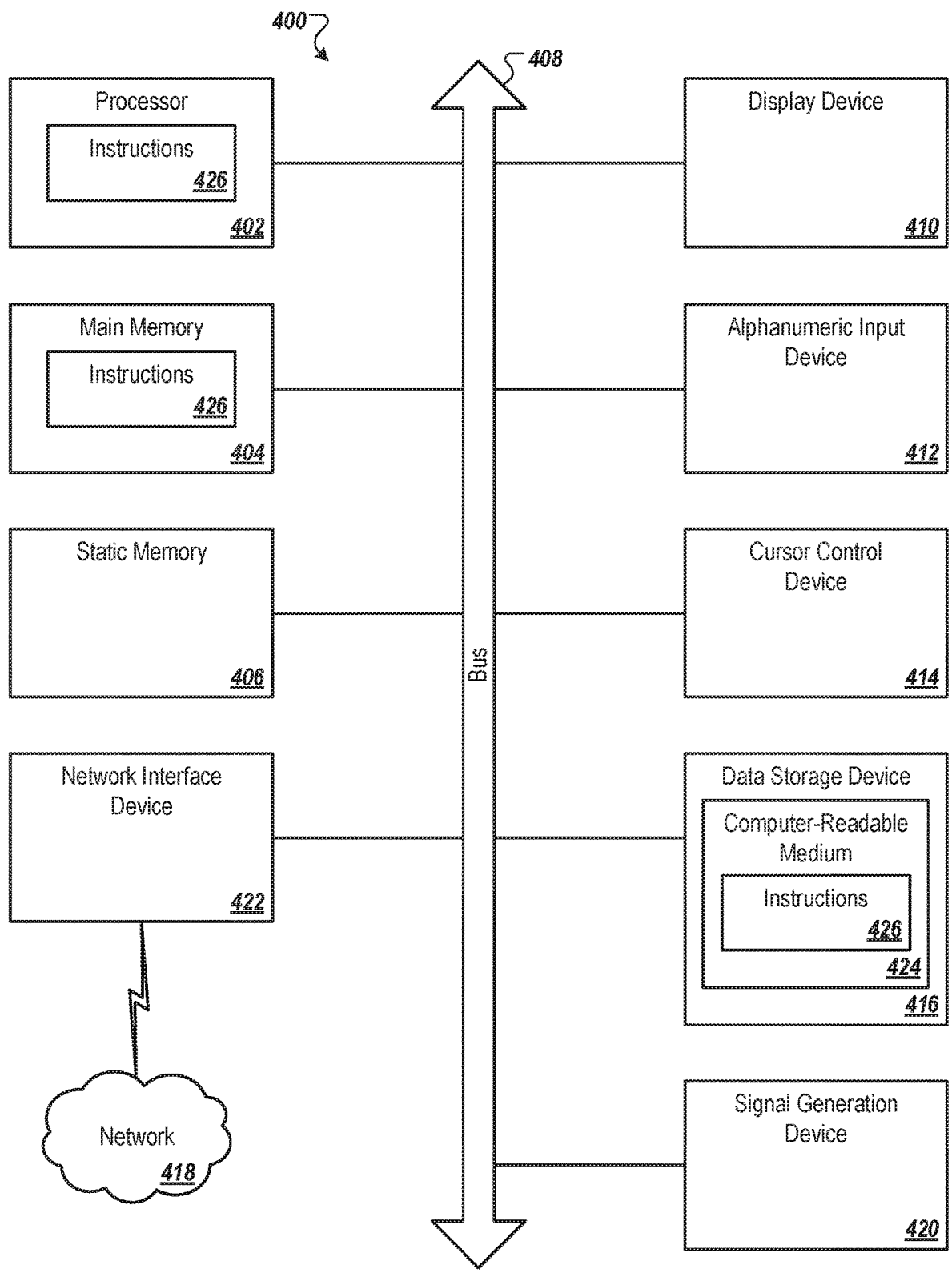
FIG. 4 illustrates a diagrammatic representation of a machine in an example form of a computing device within which a set of instructions, for causing the machine to perform any one or more of the methods discussed herein, may be executed.

FIG. 4 illustrates a diagrammatic representation of a machine in the example form of a computing device 400 within which a set of instructions, for causing the machine to perform any one or more of the methods discussed herein, may be executed. The computing device 400 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 400 includes a processing device (e.g., a processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

Processing device 402 represents one or more general-purpose processing devices such as a microprocessor, central processing unit, or the like. More particularly, the processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also include one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computing device 400 may further include a network interface device 422 which may communicate with a network 418. The computing device 400 also may include a display device 410 (e.g., a liquid crystal display (LCD) or a cathode ray tube (CRT)), an alphanumeric input device 412 (e.g., a keyboard), a cursor control device 414 (e.g., a mouse) and a signal generation device 420 (e.g., a speaker). In one implementation, the display device 410, the alphanumeric input device 412, and the cursor control device 414 may be combined into a single component or device (e.g., an LCD touch screen).

The data storage device 416 may include a computer-readable storage medium 424 on which is stored one or more sets of instructions 426 embodying any one or more of the methods or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over a network 418 via the network interface device 422.

While the computer-readable storage medium 426 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method comprising:
   receiving, by a processing device, a digital communication that a first electronic advertisement is playing on a television, the digital communication being based on content metadata of television programming;
   comparing, by the processing device, the received digital communication with information in a database;
   based on a comparison between the received digital communication and the information in the database, identifying, by the processing device, the first electronic advertisement and a type of the first electronic advertisement;
   determining, by the processing device, that a first client device is near the television while the first electronic advertisement is playing on the television;
   following the determination that the first client device is near the television, further determining, by the processing device, that a second client device has entered an area that is near the television;
   responsive to the determination that the second client device has entered the area, selecting, by the processing device, a second electronic advertisement that is different from the first electronic advertisement, the selection of the second electronic advertisement being based on a correlation between an item of interest included in a second user profile associated with the second client device and the second electronic advertisement;
   causing, by the processing device, the second electronic advertisement to play on the television;
   identifying, by the processing device, a consumer activity on the first client device or the second client device, the consumer activity including browsing a webpage related to the second electronic advertisement during at least a portion of a time in which the television plays the second electronic advertisement;
   determining, by the processing device, an effectiveness score of the second electronic advertisement based the identified consumer activity;
   selecting, by the processing device, a third electronic advertisement based on the determined effectiveness score of the second electronic advertisement; and
   causing, by the processing device, the third electronic advertisement to play on the television.

2. The method of claim 1, wherein the second electronic advertisement is caused to be played during a next commercial break.

3. The method of claim 1, wherein the determination that the first client device is near the television and the determination that the second client device has entered the area is based on presence of the television or a set-top box in communication with the television and the first client device and the second client device on the same communication network.

4. The method of claim 1, further comprising periodically pinging, by the processing device, the area near the television and listening for ping responses communicated by client devices,
   wherein:
      the determination that the first client device is near the television is based on a first ping response communicated by the first client device responsive to a first ping; and
      the determination that the first client device is near the television and the determination that the second client device has entered the area is based on a second ping response communicated by the first client device and a third ping response communicated by the second client device responsive to a second ping.

5. The method of claim 1, wherein the digital communication includes an identifier of the first electronic advertisement, a start time of the first electronic advertisement, and an end time of the first electronic advertisement.

6. The method of claim 1, wherein:
   the third electronic advertisement is another type of advertisement responsive to the determined effectiveness score being indicative of disinterest.

7. The method of claim 1, further comprising storing the determined effectiveness score in the second user profile or in a first user profile.

8. The method of claim 1, wherein:
   the consumer activity includes browsing the webpage on the first client device; and
   the effectiveness score of the second electronic advertisement is determined with respect to a first user associated with the first client device.

9. A non-transitory computer-readable medium having encoded therein programming code executable by a processor to perform or control performance of operations comprising:
   identifying a first electronic advertisement and a type of the first electronic advertisement based on a comparison between a digital communication and information in a database, the digital communication being received from a television or a set-top box, indicating that the first electronic advertisement is playing on the television, and being based on content metadata of television programming;

determining that a first client device is near the television while the first electronic advertisement is playing on the television;

following the determination that the first client device is near the television, further determining that a second client device has entered an area that is near the television;

responsive to the determination that the second client device has entered the area, selecting a second electronic advertisement that is different from the first electronic advertisement, the selection of the second electronic advertisement being based on a correlation between an item of interest included in a second user profile associated with the second client device and the second electronic advertisement;

causing the second electronic advertisement to play on the television;

identifying a consumer activity on the first client device or the second client device, the consumer activity including browsing a webpage related to the second electronic advertisement during at least a portion of a time in which the television plays the second electronic advertisement;

determining an effectiveness score of the second electronic advertisement based the identified consumer activity;

selecting a third electronic advertisement based on the determined effectiveness score of the second electronic advertisement; and causing the third electronic advertisement to play on the television.

10. The non-transitory computer-readable medium of claim 9, wherein: the third electronic advertisement is another type of advertisement responsive to the determined effectiveness score being indicative of disinterest.

11. The non-transitory computer-readable medium of claim 9, wherein the operations further comprise storing the determined effectiveness score in the second user profile or in a first user profile.

12. The non-transitory computer-readable medium of claim 9, wherein:
the second electronic advertisement is caused to be played during a next commercial break; and
the digital communication includes an identifier of the first electronic advertisement, a start time of the first electronic advertisement, and an end time of the first electronic advertisement.

13. The non-transitory computer-readable medium of claim 9, wherein:
the operations further comprise periodically pinging an area near the television and listening for ping responses communicated by client devices;
the determination that the first client device is near the television is based on a first ping response communicated by the first client device responsive to a first ping; and
the determination that the first client device is near the television and the determination that the second client device has entered the area is based on a second ping response communicated by the first client device and a third ping response communicated by the second client device responsive to a second ping.

14. A system comprising:
a memory; and
a processing device operatively coupled to the memory, the processing device being configured to:
identify a first electronic advertisement and a type of the first electronic advertisement based on a comparison between a received digital communication and information in a database, the received digital communication being received from a television or a set-top box, indicating that the first electronic advertisement is playing on the television, and being based on content metadata of television programming;
determine that a first client device is near the television while the first electronic advertisement is playing on the television;
responsive to a determination that a second client device has entered an area, select a second electronic advertisement that is different from the first electronic advertisement, the selection of the second electronic advertisement being based on a correlation between an item of interest included in a second user profile associated with the second client device and the second electronic advertisement;
cause the second electronic advertisement to play on the television;
identify a consumer activity on the first client device or the second client device during at least a portion of a time in which the television plays the second electronic advertisement, the consumer activity including browsing a webpage related to the second electronic advertisement;
determine an effectiveness score of the second electronic advertisement based the identified consumer activity;
select a third electronic advertisement based on the determined effectiveness score of the second electronic advertisement; and
cause the third electronic advertisement to play on the television.

15. The system of claim 14, wherein:
the third electronic advertisement is another type of advertisement responsive to the determined effectiveness score being indicative of disinterest.

16. The system of claim 14, wherein:
the second electronic advertisement is caused to be played during a next commercial break; and
the received digital communication includes an identifier of the first electronic advertisement, a start time of the first electronic advertisement, and an end time of the first electronic advertisement.

17. The system of claim 14, wherein the processing device is further configured to store the effectiveness score in the second user profile or in a first user profile.

18. The system of claim 14, wherein:
the processing device is further configured to periodically ping an area near the television and listening for ping responses communicated by client devices;
the determination that the first client device is near the television is based on a first ping response communicated by the first client device responsive to a first ping; and
the determination that the first client device is near the television and the determination that the second client device has entered the area is based on a second ping response communicated by the first client device and a third ping response communicated by the second client device responsive to a second ping.

* * * * *